(12) United States Patent
Osawa et al.

(10) Patent No.: US 11,826,893 B2
(45) Date of Patent: Nov. 28, 2023

(54) ELECTRIC POWER WORK DEVICE

(71) Applicant: Yamabiko Corporation, Tokyo (JP)

(72) Inventors: Hisato Osawa, Tokyo (JP); Takeshi Maeno, Tokyo (JP); Kenji Nakano, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 152 days.

(21) Appl. No.: 16/897,122

(22) Filed: Jun. 9, 2020

(65) Prior Publication Data

US 2020/0398417 A1 Dec. 24, 2020

(30) Foreign Application Priority Data

Jun. 20, 2019 (JP) .................................. 2019-114765

(51) Int. Cl.
*B25F 5/02* (2006.01)
*H01M 50/213* (2021.01)
*B27B 17/00* (2006.01)

(52) U.S. Cl.
CPC .......... *B25F 5/023* (2013.01); *B27B 17/0008* (2013.01); *H01M 50/213* (2021.01)

(58) Field of Classification Search
CPC ... B25F 5/023; B25F 5/02; B25F 5/29; B27D 17/0008; B27D 17/00; H01M 50/213; B27B 17/00; B27B 17/0008
See application file for complete search history.

(56) References Cited

U.S. PATENT DOCUMENTS

| | | | | |
|---|---|---|---|---|
| 6,161,293 A | * | 12/2000 | Watson | .................. B23D 45/16 30/DIG. 1 |
| 8,528,217 B2 | * | 9/2013 | Kondo | .................... B27B 17/00 30/296.1 |
| 9,713,880 B2 | * | 7/2017 | Haneda | ..................... B25F 5/02 |

(Continued)

FOREIGN PATENT DOCUMENTS

DE 102013212637 A1 12/2014
EP 2540153 A1 1/2013

(Continued)

OTHER PUBLICATIONS

Extended European Search Report for European Application No. 20179901.2, dated Sep. 22, 2020.

*Primary Examiner* — Joshua G Kotis
*Assistant Examiner* — Scott A Howell
(74) *Attorney, Agent, or Firm* — The Marbury Law Group, PLLC (57) ABSTRACT

An electric power work device simplifies a mechanism of a battery attachment part and easily removes a battery from the battery attachment part. A chain saw includes a body case, a cutting part (a work tool), and the battery. A battery removal mechanism for removing the battery is provided on a rear part of the body case. The battery removal mechanism includes a lower end of the battery and a bottom surface of the body case. The lower end of the battery protrudes downward from the bottom surface of the body case, and a frontmost end of a lower part of the battery is disposed in front of a rear end of a lower part of a top handle. Another battery removal mechanism includes a protrusion on the bottom surface of the body case and in front of the lower end of the battery.

10 Claims, 7 Drawing Sheets

(56) References Cited

U.S. PATENT DOCUMENTS

| | | | | |
|---|---|---|---|---|
| 2007/0240892 A1* | 10/2007 | Brotto | ............... | B25D 11/00 |
| | | | | 83/788 |
| 2010/0314146 A1* | 12/2010 | Kondo | ............... | B27B 17/00 |
| | | | | 173/171 |
| 2011/0078910 A1* | 4/2011 | Tomita | ............ | B27B 17/083 |
| | | | | 173/217 |
| 2011/0162219 A1 | 7/2011 | Okouchi | | |
| 2012/0317821 A1* | 12/2012 | Tsuchiya | ........... | A01G 3/053 |
| | | | | 30/196 |
| 2013/0165027 A1* | 6/2013 | Sugita | ................ | B25F 5/02 |
| | | | | 451/344 |
| 2014/0047722 A1* | 2/2014 | Onose | ............... | B27B 17/00 |
| | | | | 30/383 |
| 2015/0375416 A1* | 12/2015 | Haneda | ............. | B27B 17/02 |
| | | | | 30/383 |
| 2017/0203462 A1 | 7/2017 | Haneda et al. | | |

FOREIGN PATENT DOCUMENTS

| | | |
|---|---|---|
| EP | 3181280 A1 | 6/2017 |
| GB | 2516558 A | 1/2015 |
| JP | 5530186 B | 6/2014 |
| WO | 2014/119174 A1 | 8/2014 |

\* cited by examiner

ELECTRIC POWER WORK DEVICE

CROSS-REFERENCE TO RELATED APPLICATIONS

This application claims the benefit of priority from Japanese Patent No. 5530186, the entire contents of which are incorporated herein by reference.

BACKGROUND OF THE INVENTION

The present disclosure relates to an electric power work device.

There has been a conventional electric chain saw which receives a motor in a body case and includes a battery attachment part where a battery is detachably attached to a rear part of the body case (see, e.g., Japanese Patent No. 5530186). Such a chain saw includes a larger battery relative to a chain saw receiving a battery in a body case.

SUMMARY OF THE INVENTION

The battery of the conventional electric chain saw, when being charged, is pushed up, and removed from the battery attachment part. The disclosure herein provides an electric power work device which has the battery easily removed from the battery attachment part.

A first disclosure for the electric power work device includes: a body case; a work tool protruding forward from a front part of the body case; a motor driving the work tool; and a battery supplying electric power to the motor. The body case receives the motor, and an upper end of the body case includes a top handle extending in a longitudinal direction. A rear part of the body case includes a battery attachment part to which the battery is detachably attached and a battery removal mechanism for removing the battery upward from the battery attachment part. The battery removal mechanism includes a lower end of the battery and a bottom surface of the body case. While the battery is attached to the battery attachment part, the lower end of the battery protrudes downward from a rear part of the bottom surface of the body case, and a frontmost end of a lower part of the battery is disposed in front of a rear end of a lower part of the top handle.

A second disclosure for an electric power work device includes: a body case; a work tool protruding forward from a front part of the body case; a motor driving the work tool; and a battery supplying electric power to the motor. The body case receives the motor, and an upper end of the body case includes a top handle extending both forward and backward. A rear part of the body case includes a battery attachment part to which the battery is detachably attached and a battery removal mechanism for removing the battery upward from the battery attachment part. The battery removal mechanism includes a lower end of the battery, a bottom surface of the body case and a protrusion formed on the bottom surface of the body case. When the battery is attached to the battery attachment part, the lower end of the battery protrudes downward from a rear part of the bottom surface of the body case, and the protrusion is disposed in front of the lower end of the battery.

The electric power work device of this disclosure is placed on a floor, a rear part of the top handle is pushed down, and thus the rear part of the body case moves downward relative to the battery. That is, the battery moves upward relative to the battery attachment part. The electric power work device of this disclosure includes the battery and the battery attachment part behind the top handle. The top handle is pushed, and the battery is easily removed from the battery attachment part. Furthermore, when the rear part of the top handle is pushed down, a load on the body case is reduced.

DESCRIPTION OF THE EMBODIMENTS

An example of the embodiment of this disclosure will be appropriately described in detail with references to the drawings. The embodiment will be described as an example where the disclosure is applied to a chain saw which cuts objects including a tree and a board. The embodiment will be described with a cutting part of the chain saw as a front side and the top handle as an upper side.

Figure 1:
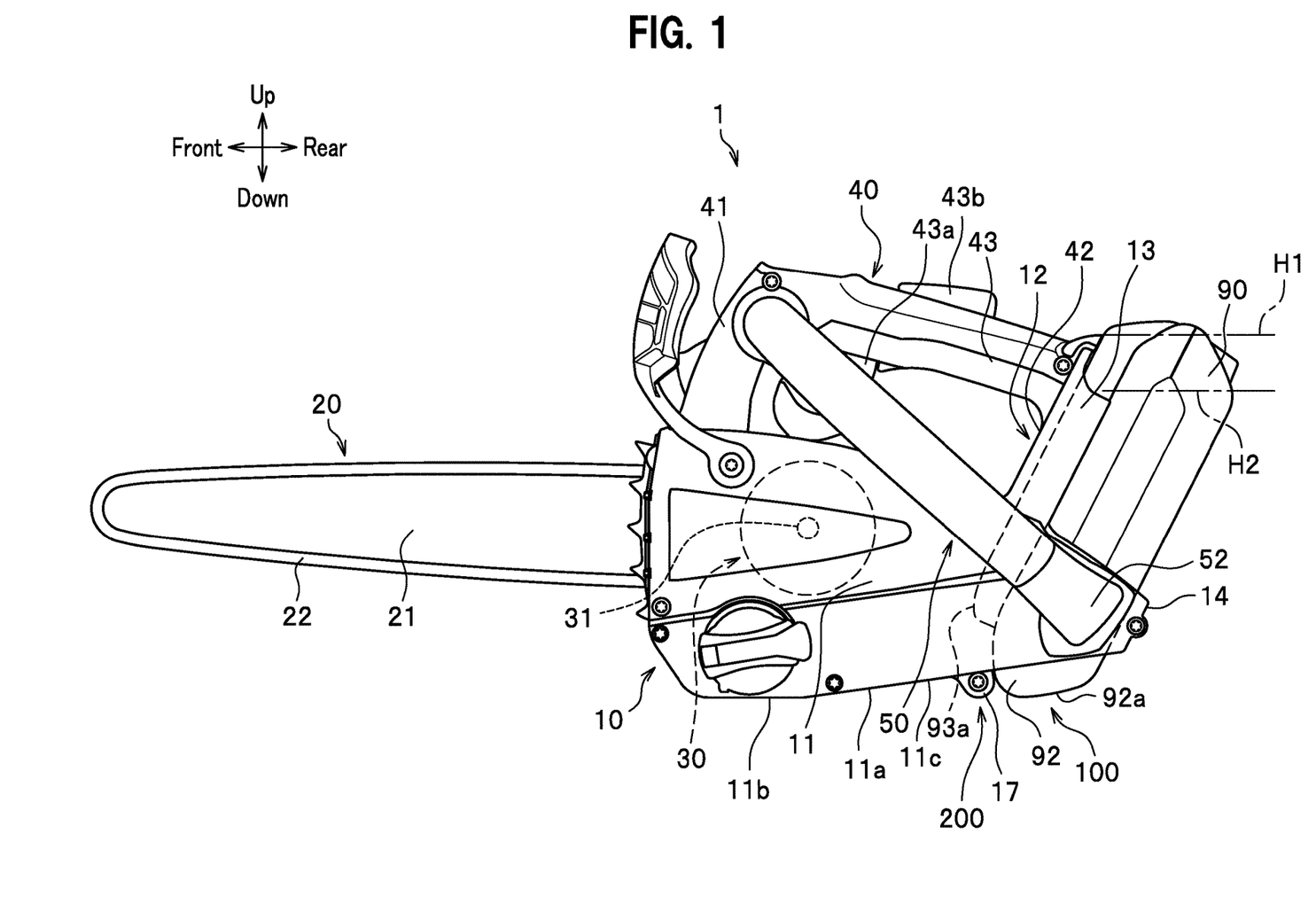
FIG. 1 is a side view showing a chain saw according to an example of an embodiment.

A chain saw 1 of this embodiment, as shown in FIG. 1, includes a body case 10, a cutting part 20 provided on the body case 10, a motor 30 for driving the cutting part 20, and a battery 90. In the chain saw 1, the motor 30 is supplied with electric power from the battery 90 attached in the body case 10 and thus drives the cutting part 20.

Figure 2:
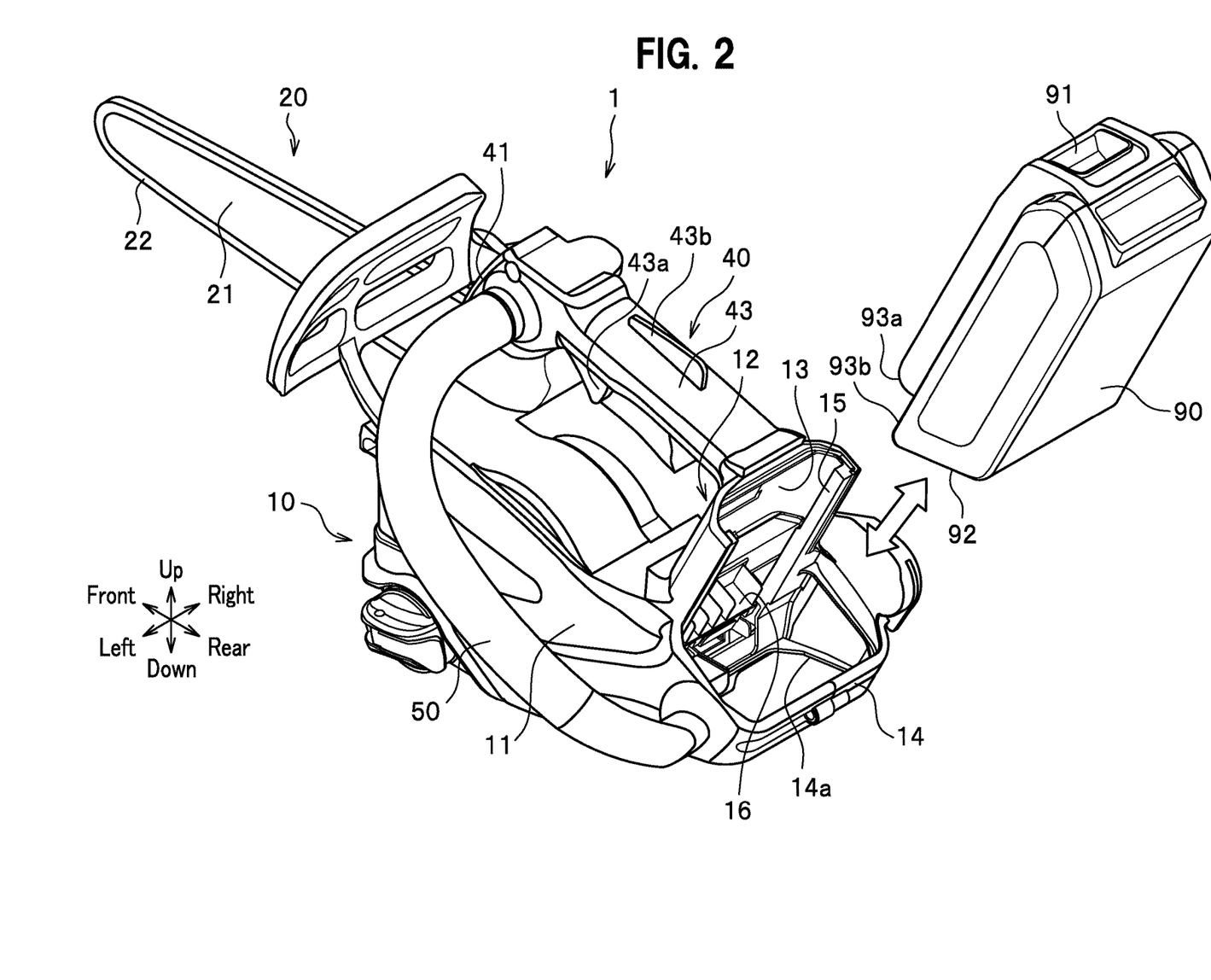
FIG. 2 is a perspective view of the chain saw as viewed from upper left rear, in which a battery is removed from the body case, according to the example of the embodiment.

The body case 10, as shown in FIG. 2, includes a body part 11 of a box made of a resin and a top handle 40 provided above the body part 11. Namely, the body case 10 includes the top handle 40 at the upper end. The body case 10 has a left side surface attached with a side handle 50 which is disposed on the left side of the top handle 40 and extends from the front part to the rear part of the body case 10. The body part 11 of the body case 10 is divided into right and left parts (see FIG. 3), and the right and left parts are joined together with bolts at joint parts.

The front part of the body part 11, as shown in FIG. 1, receives the motor 30 which is a conventional electric motor. The motor 30 includes an output shaft 31 extending in a lateral direction. The front part of the body part 11 receives, in addition to the motor 30, a control board configured to control a drive on the motor 30 (not shown), and a drive mechanism including a driving gear coupled to the output shaft 31 of the motor 30 (not shown).

The top handle 40 is formed continuously on the upper surface of the body part 11 and extends above the body part 11 in a longitudinal direction. The front end 41 of the top handle 40 protrudes upward from the front end of the upper surface of the body part 11. The rear end 42 of the top handle 40 is joined to the upper end of a holding part 13 of a battery attachment part 12 which will be described later.

The top handle 40 includes between the front end 41 and the rear end 42 a gripping part 43 which extends in the longitudinal direction. The gripping part 43 inclines slightly obliquely downward from the front end 41 to the rear end 42 of the top handle 40.

The gripping part 43 is grasped by an operator while the operator holds the chain saw 1. The gripping part 43 and the upper surface of the body part 11 have therebetween a space in which the operator puts his hand. The gripping part 43 includes a trigger lever 43a which is an operating mechanism to increase or decrease a revolution number of a saw-chain 22, and a lock release lever 43b which releases the trigger lever 43a, while the operator grasps the gripping part 43.

The rear part of the top handle 40 is provided with the battery attachment part 12 where the battery 90 is detachably attached. The battery attachment part 12 is formed on the rear surface of the body part 11. The battery attachment part 12 includes the holding part 13 which holds the battery 90 and a battery case 14 which receives the lower end of the battery 90.

The holding part 13 is provided with the rear end of the body part 11 and a plate part which extends upward from the rear end of the body part 11. The holding part 13 inclines such that the lower end thereof is disposed in front of the upper end thereof. The rear end of the holding part 13, as shown in FIG. 2, has an inclined surface which extends forward as the holding part 13 extends from the upper end to the lower end. The upper end of the holding part 13 is joined to the rear end 42 of the top handle 40.

The rear surface of the holding part 13 includes an attachment/detachment mechanism 15 for releasing the battery 90. The attachment/detachment mechanism 15 includes a guiding member in which the battery 90 is fitted in a vertical direction; and a support member (not shown) supporting the battery 90 from the bottom.

The battery 90 is a conventional one and receives rechargeable battery cells such as lithium ion storage battery in a rectangular parallelepiped case which extend in a vertical direction shown in FIG. 2. The upper part of the battery 90 includes a joint lever 91 to engage the upper end of the holding part 13.

When the battery 90 is attached to the battery attachment part 12, the battery 90 is slid downward on the attachment/detachment mechanism 15 and is attached to the holding part 13 (see FIG. 1). When the battery 90 is pushed down to a position where the battery 90 is supported by the support member of the holding part 13, the joint lever 91 of the battery 90 engages the upper end of the holding part 13, and thus the battery 90 is joined to the battery attachment part 12.

When the battery 90 is removed from the battery attachment part 12, the joint lever 91 is pulled to release engagement between the holding part 13 and the joint lever 91. This allows the battery 90 to slide upwardly on the holding part 13.

The rear part of the holding part 13 includes a connection terminal 16 made of a metal. The connection terminal 16 electrically connects to the control board and the motor 30 (see FIG. 1). The holding part 13 is connected to the connection terminal of the battery 90, and this allows electric power to be supplied from the battery 90 to the control board and the motor 30.

The height of the battery 90, as shown in FIG. 1, is larger than that of the rear part of the body part 11. The battery 90 of this embodiment is larger in size than a battery which is received in the body case 10. The battery 90 has a sufficiently high output and a large charging capacity suitable for operation.

While the battery 90 is attached to the battery attachment part 12, the longitudinal direction of the battery 90 corresponds to the vertical direction of the body case 10. The battery 90 attached to the holding part 13 is larger in size than the rear part of the body part 11. The battery 90 is vertically over a central part in the vertical direction of the rear part of the body part 11.

While the battery 90 is attached to the battery attachment part 12, the upper end of the battery 90 protrudes upward from the lower peripheral end 1-12 and the upper peripheral end H1 of the rear end 42 of the top handle 40.

The battery case 14 is formed at the lower end of the battery attachment part 12. The battery case 14 having a cylindrical shape receives the lower end of the battery 90 (see FIG. 2). The lower part of the battery 90 is inserted in the battery case 14 from the upper side of an opening part 14a with the bottom of the battery 90 directed downward. While the battery 90 is attached to the battery attachment part 12, the lower end 92 of the battery 90 protrudes downward from the opening part 14a of the lower end of the battery case 14.

The right side of the body part 11 is provided with the cutting part 20 protruding forward (see FIG. 2). The cutting part 20 is a working member for a cutting operation and includes a guide bar 21 and a saw-chain 22. The guide bar 21 is a plate member extending in the longitudinal direction and includes a rear end part attached on the right side of the body part 11. The annular saw-chain 22 is wound around the outer circumference of the guide bar 21. The rear end of the saw-chain 22 engages the driving gear coupled to the output shaft 31 of the motor 30. When the motor 30 is driven to rotate the driving gear (not shown), the saw-chain 22 rotates along the outer circumference of the guide bar 21.

The side handle 50 extends across the left side surface of the body case 10 from the front part to the rear part in the longitudinal direction. The side handle 50 is formed by bending a columnar member (see FIG. 2). The front end of the side handle 50 is attached on the left side surface of the front end 41 of the top handle 40. The rear end of the side handle 50 is disposed behind and below the output shaft 31 and attached on the left wall of the battery case 14. The side handle 50, as shown in FIG. 2, has a potion between the front end and the rear end, which curves to bulge outward away from the left surface of the body case 10.

When cutting objects such as a tree and a plate with the chain saw 1 as shown in FIG. 1, an operator grasps the gripping part 43 of the top handle 40 with the right hand and the side handle 50 with the left hand and carries the chain-saw 1.

When an operator grasps the gripping part 43 of the top handle 40, the operator pushes down the lock release lever 43b with the palm of hand, and thus unlocks the trigger lever 43a. When the operator pulls the trigger lever 43a, the motor 30 starts to rotate the saw-chain 22. This allows saw-chain 22 to cut an object.

Figure 4:
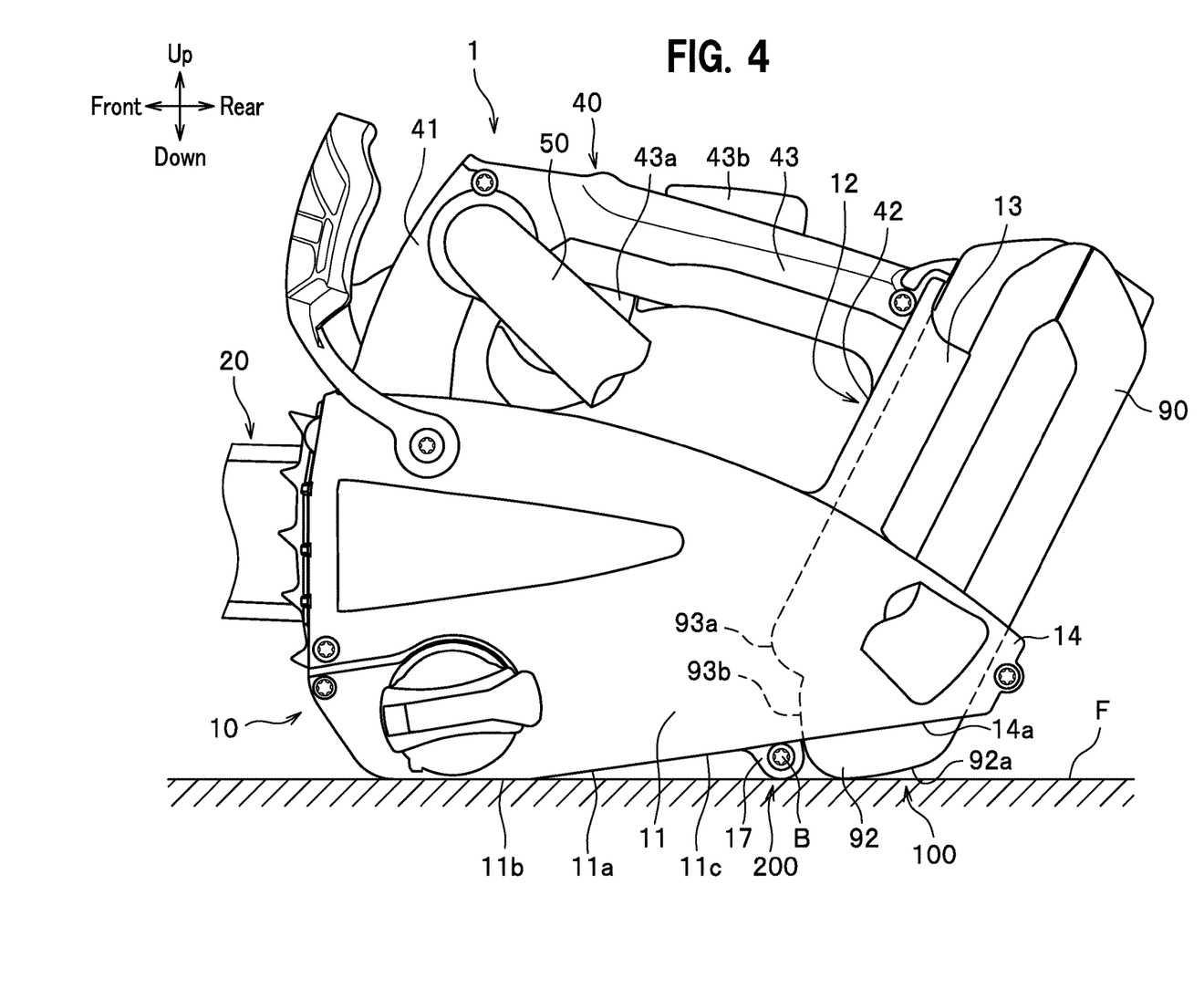
FIG. 4 is a side view showing the chain saw being placed on a floor according to the example of the embodiment.

In the chain saw 1 of this embodiment, the body part 11 of the body case 10 has a bottom surface 11a which includes a flat front part 11b, and a rear part 11c which inclines upward as the rear part lie extends rearward. When the chain saw 1 is placed on a flat floor F, the front part 11b of the bottom surface 11a of the body part 11, as shown in FIG. 4, contacts with the floor F and the rear part lie thereof and the battery case 14 is apart from the floor F.

Figure 3:
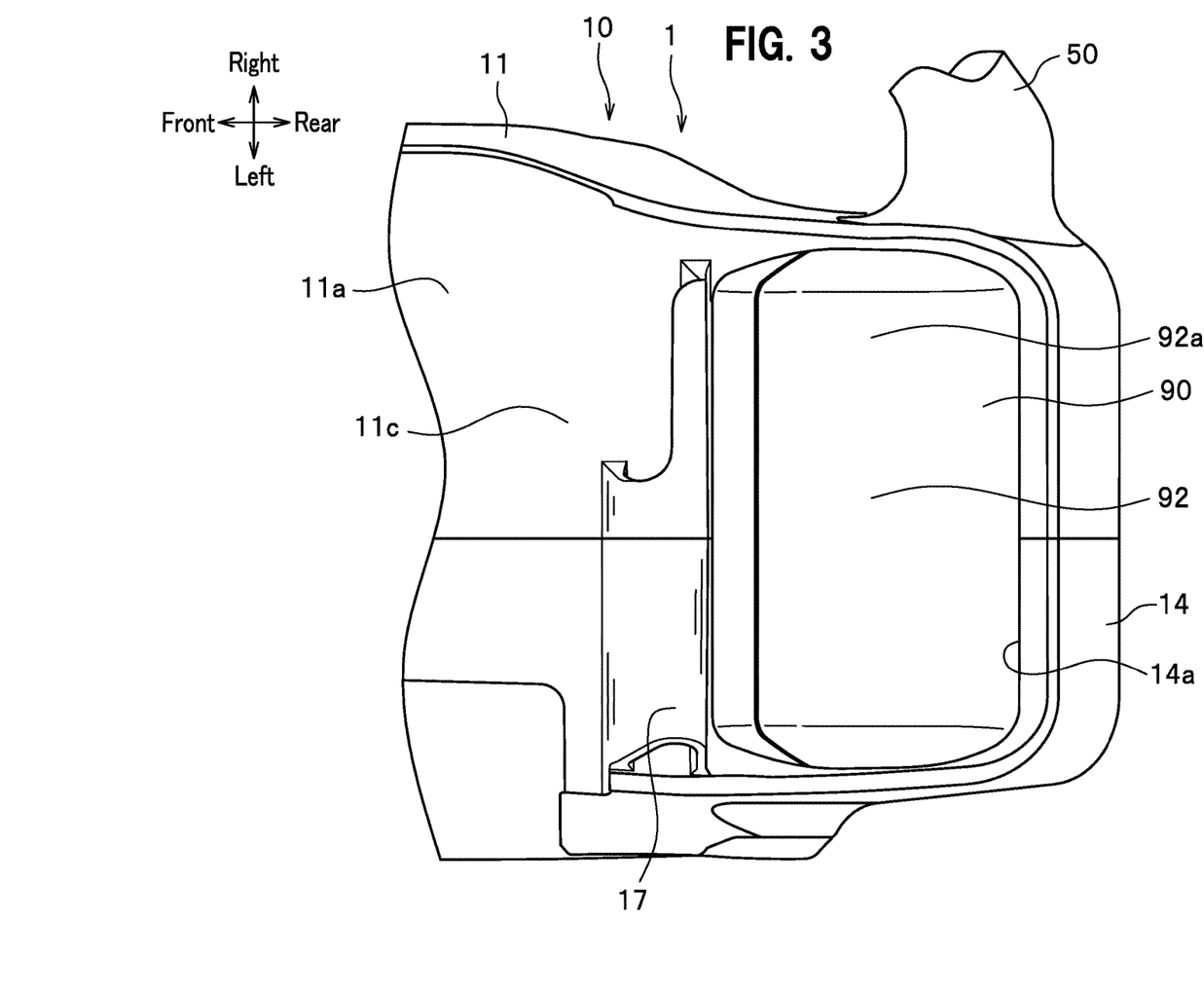
FIG. 3 is a bottom view showing a rear part of the chain saw according to the example of the embodiment.

The chain saw 1 of this embodiment includes a protrusion 17 on the rear part 11c of the bottom surface 11a of the body part 11. The protrusion 17, as shown in FIG. 3, extends in the lateral direction along the front peripheral part of the opening part 14a on the lower side of the battery case 14. The protrusion 17 is disposed near the front peripheral part of the opening part 14a on the lower side of the battery case 14. That is, the protrusion 17 is disposed in front of and opposed to the lower end 92 of the battery 90 protruding downward from the battery case 14

The protrusion 17 has a cylindrical shape and extends in the lateral direction. The outer circumference on the lower side of the protrusion 17, as shown in FIG. 4, curves in an arc about the axis in the lateral direction. When the chain saw 1 is placed on the floor F, the lower end of the protrusion 17 or the lower end 92 of the battery 90 comes in contact with the floor F. This makes the body case 10 stable on the floor F. Particularly, when the chain saw 1 is placed on the floor F, the lower end of the protrusion 17 contacts with the floor F and the lower end 92 of the battery 90 does not contact with the floor F. This prevents the battery 90 from butting strongly against the floor F.

The protrusion 17, as shown in FIG. 3, is divided into two parts, which are attached on the right and left parts of the body part 11 respectively and has a screw groove on the inner surface. A bolt B (see FIG. 4) is inserted into the protrusion 17 and is engaged with the screw groove of the protrusion 17, and thus the right and left parts of the body part 11 are joined together. The protrusion 17 is one of joint parts to join right and left parts of the body part 11 together.

The chain saw 1 of this embodiment, as shown in FIG. 4, includes a first battery removal mechanism 100 and a second battery removal mechanism 200 to remove the battery 90 from the battery attachment part 12.

The first battery removal mechanism 100 includes the lower end 92 of the battery 90 and the bottom surface 11a of the body part 11 of the body case 10. The first battery removal mechanism 100 is constructed such that, while the chain saw 1 is placed on the floor F, the frontmost end 93a of the lower end of the battery 90 is disposed in front of the rear end 42 of the top handle 40. In this embodiment, the frontmost end 93a of the lower end of the battery 90 is disposed in front of the rear end 42 of the lower part of the top handle 40.

Thus, when the frontmost end 93a of the lower part of the battery 90 is disposed in front of the rear end 42 of the top handle 40, the lower surface 92a of the battery 90 is necessarily disposed in front of the rear end 42 of the top handle 40. Note that the front part 93b of the lowermost end of the battery 90 may be disposed in front of the rear end 42 of the top handle 40.

Particularly, a contact point between the floor F and the battery 90 may be disposed in front of or right under the rear end 42 of the top handle 40. In this embodiment, the lower surface 92a of the lower end 92 of the battery 90 has an inclined surface which extends downward as extending from the rear part to the front part of the lower end 92. This structure allows the contact point between the floor F and the lower end 92 to shift forward of the battery 90.

The second battery removal mechanism 200 includes the lower end 92 of the battery 90, the bottom surface 11 a of the body case 10 and the protrusion 17 formed on the rear part 11c of the bottom surface 11a of the body part 11. In the second battery removal mechanism 200, while the chain saw 1 is placed on the floor F, the protrusion 17 is disposed right under the rear part of the top handle 40.

When the battery 90 is removed from the chain saw 1 of this embodiment, the chain saw 1 is placed in the floor F in the chain saw 1 placed on the floor F, the front part 11b of the bottom surface 11a of the body part 11 come in contact with the floor F, and at least one of the protrusion 17 and the lower end 92 of the battery 90 comes in contact with the floor F. The rear part 11c of the bottom surface 11a of the body part 11 is apart from the floor F Subsequently, an operator pulls the joint lever 91 of the battery 90 (see FIG. 2) to release the joint between the battery 90 and the battery attachment part 12.

Figure 5:
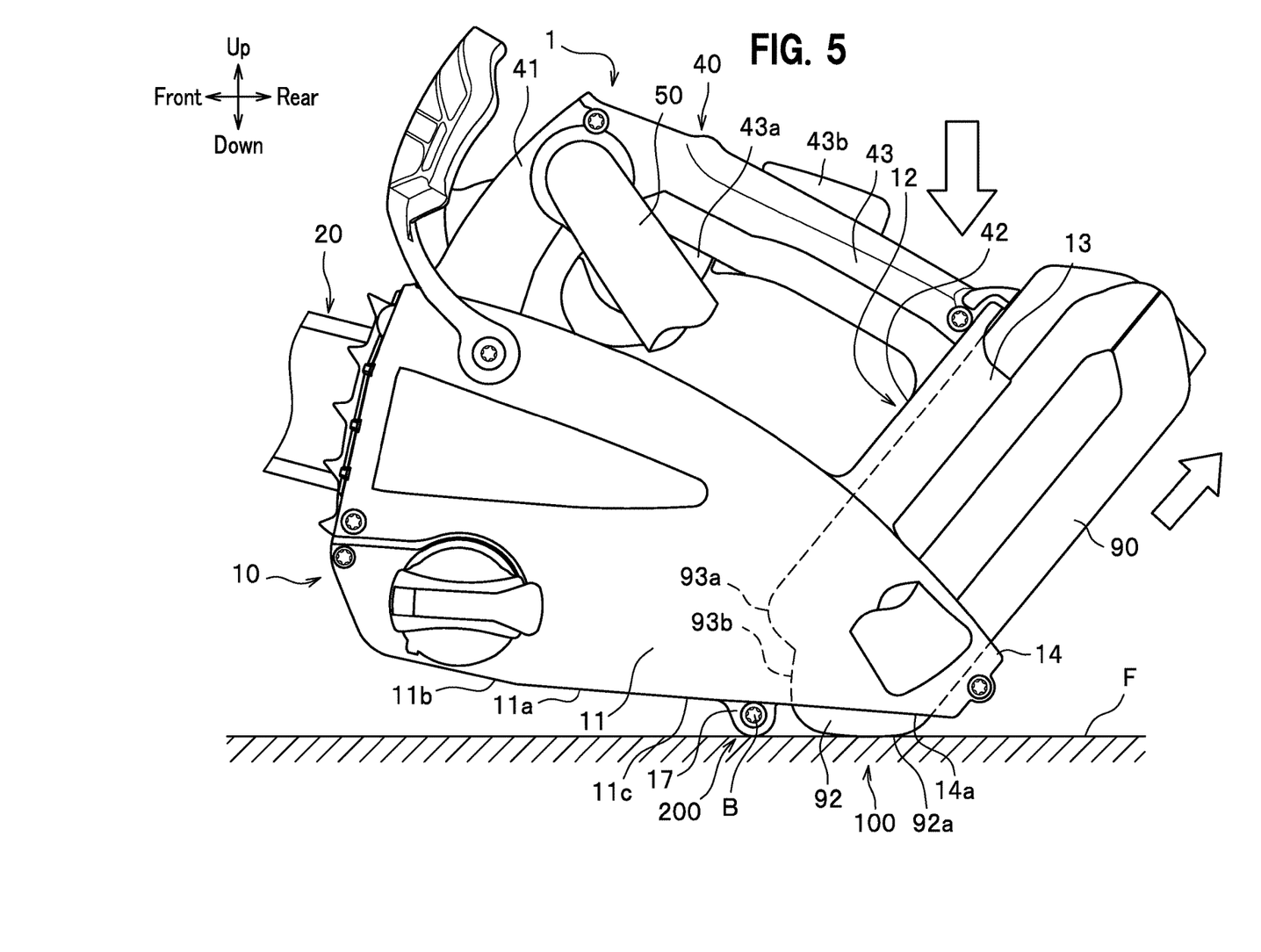
FIG. 5 is a side view of the chain saw showing how to remove the battery from the chain saw according to the example of the embodiment.

Next, as shown in FIG. 5, an operator pushes down the rear part of the top handle 40. In the chain saw 1 placed on the floor F, when the front part 11b of the body part 11 and the protrusion 17 contact with the floor F, the rear part of the top handle 40 is pushed down to rotate about the protrusion 17 as a fulcrum.

When the rear part of the top handle 40 is pushed down, the body case 10 inclines to rotate about the protrusion 17 as a fulcrum to move the rear part downward, and thus the rear part of the body case 10 is moved downward relative to the battery 90. That is, the battery 90 moves upward relative to the battery attachment part 12. The protrusion 17 may be disposed in front of or right under the rear end 42 of the top handle 40, and thus an operator easily adjusts a push-down force when pushing down the rear part of the top handle 40 to rotate about the protrusion 17 as a fulcrum.

Furthermore, in the chain saw 1 on the floor F, the front part 11b of the body part 11 and the lower end 92 of the battery 90 contact with the floor F. In this case, when the rear part of the top handle 40 is pushed down, the protrusion 17 comes into contact with the floor F. In doing so, the protrusion 17 performs as a stopper, and thus reduces a load on the body case 10 due to an impact caused by the contact of the body part 11 with the floor F. Note that the protrusion 17 and the lower end 92 of the battery 90 may be closer to each other in the vertical direction. This makes it difficult for a large impact to exert on the protrusion 17 when the protrusion 17 comes into contact with the floor F. Then, the body case 10 inclines such that the rear part of the body part 11 moves downward to rotate about the protrusion 17 as a fulcrum, and thus the rear part of the body case 10 moves downward relative to the battery 90. The protrusion 17 may be disposed in front of or right under the rear end 42 of the lower end part 42 of the top handle 40, and thus an operator easily adjusts a push-down force when pushing down the rear part of the top handle 40 to rotate about the protrusion 17 as a fulcrum.

Thus, when the battery 90 moves upward relative to the battery attachment part 12, the battery attachment part 12 and the battery 90 remain disjoined even if an operator takes his hand off the joint lever 91 of the battery 90. Then, the operator pulls the battery 90 upward to pull the battery 90 out of the holding part 13, and thus removes the battery 90 from the battery attachment part 12.

The above-described chain saw 1 (an electric power work device) as shown in FIG. 5, has the battery removal mechanism 100 of this embodiment, and when pushing down the top handle 40, an operator removes a battery 90 while adjusting a push-down force with a small force. This reduces a load on the body case 10. Furthermore, the chain saw 1 has the battery removal mechanism 200 of this embodiment and thus the operator removes the battery 90 while adjusting a push-down force. This also reduces a load on the body case 10.

In the chain saw 1 of this embodiment, the rear part of the top handle 40 is pushed with a small force and the battery 90 is removed easily from the battery attachment part 12, even if the battery attachment part 12 has no eject mechanism. The chain saw 1 of this embodiment, therefore, reduces the number of parts due to a simplified structure of the battery attachment part 12, and thus reduces its production cost.

The chain saw 1 of this embodiment includes the side handle 50 attached on the side surface of the body case 10. When removing the battery 90 from the chain saw 1, an operator grasps the side handle 50 with one hand and pushes down the top handle 40 with the other hand, and thus removes the battery 90 stably.

In the chain saw 1 of this embodiment, as shown in FIG. 4, the lower end 92 of the battery 90 and protrusion 17 of the body ease 10 serve as contact points with the floor F and are arranged below the rear part of the top handle 40. In such construction, as shown in FIG. 5, when the rear part of the top handle 40 is pushed down, a pushing pressure is applied to the lower end 92 of the battery 90 and the protrusion 17 of the body case 10. This reduces a load on the body ease 10.

In the chain saw 1 of this embodiment, the lower surface 92a of the lower end 92 of the battery 90 has an inclined surface which extends downward as extending from the rear part to the front part of the lower end 92. This structure allows the contact point between the floor F and the lower end 92 to shift forward.

In the chain saw 1 of this embodiment, as shown in FIG. 1, the battery 90 attached to the battery attachment part 12 is disposed such that a longitudinal direction of the battery 90 corresponds to a vertical direction of the body case 10. This construction allows the center of gravity of the battery 90 to shift forward comparing to a construction where the longitudinal direction of the battery 90 is corresponds to the lateral direction even if the battery 90 has a larger height. This improves operability in use of the chain saw 1 having a large battery 90 and downsizes the chain saw 1.

In the chain saw 1 of this embodiment, with the battery 90 attached to the battery attachment part 12, the upper end of the battery 90 protrudes upward from both the lower peripheral end H2 and the upper peripheral end H1 of the rear end 42 of the top handle 40. A height of the battery 90 is set as described above, and thus a discharging and charging capacity of the battery 90 increases.

In the chain saw 1 of this embodiment, the battery attachment part 12 inclines such that the upper end is disposed behind the lower end thereof, and the battery 90 inclines backward to be apart from the gripping part 43. In this construction, when an operator grasps the gripping part 43, the upper end of the battery 90 does not interfere with the operator even if the battery 90 is longer in a vertical direction, and this allows the battery 90 to enlarge in size without deteriorating an operability of the chain saw 1. Furthermore, the battery 90 inclines as described above and the lower end of the battery 90 moves forward, and thus allows the center of gravity of the chain saw 1 to shift forward.

The embodiment of this disclosure has been described, however, the disclosure herein is not limited to the embodiments described above and changes appropriately in any forms without deviation from general meanings in this disclosure. The chain saw 1 of this embodiment, as shown in FIG. 1, includes both the first battery removal mechanism 100 and the second battery removal mechanism 200. The chain saw 1, however, may include either the first battery removal mechanism 100 or the second battery removal mechanism 200.

Figure 6:
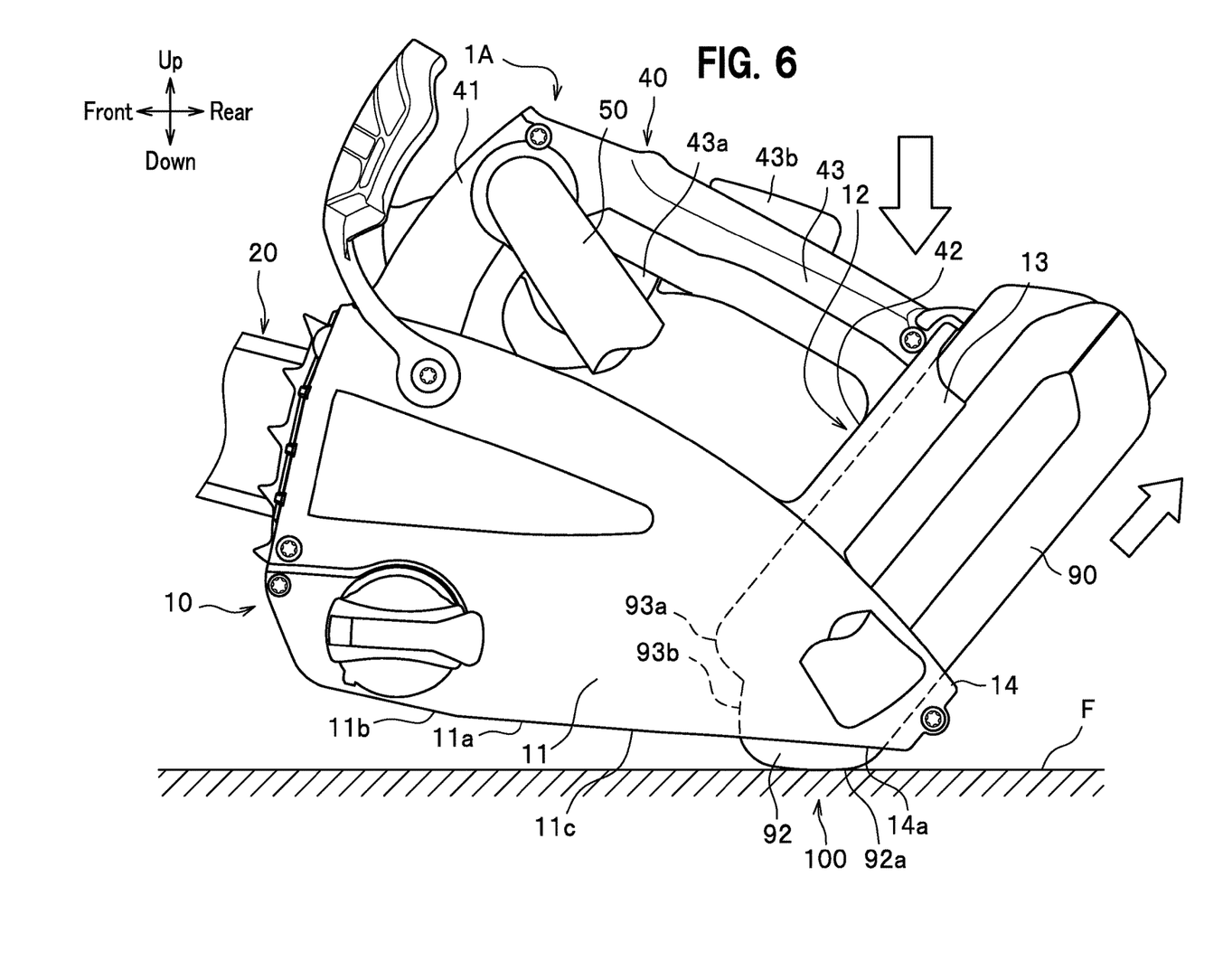
FIG. 6 is a side view showing how to remove the battery from the chain saw according to another example of the embodiment.
Figure 7:
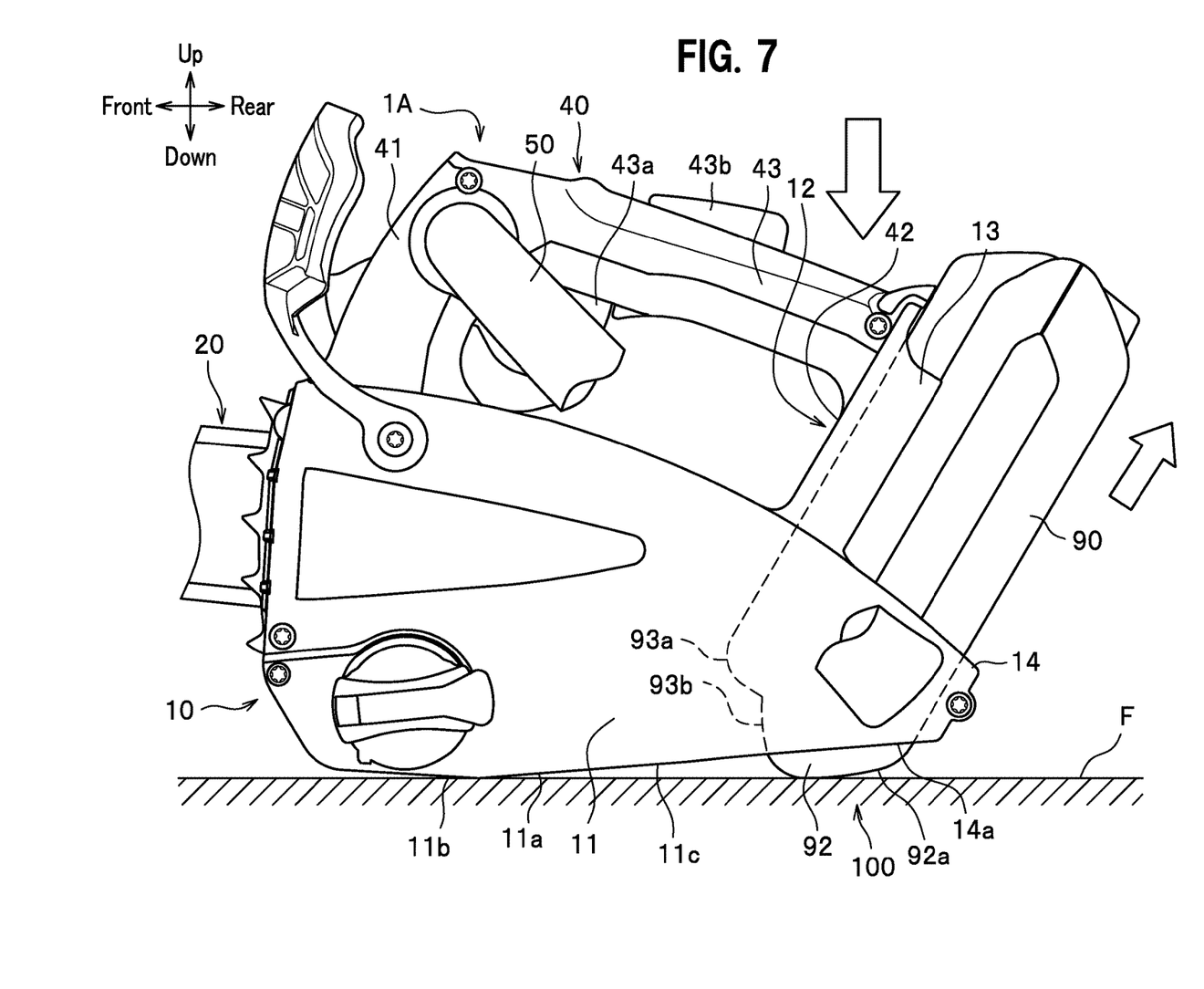
FIG. 7 is a side view showing how to remove the battery from the chain saw according to another example of the embodiment.

For example, a chain saw 1A as shown in FIGS. 6, 7 may include the first battery removal mechanism 100 alone without a protrusion (the second battery removal mechanism 200) provided on the bottom surface 11a of the body part 11. In the chain saw 1A, when the rear part of the top handle 40 is pushed down, the rear part of the body case 10 moves downward relative to the battery 90, and thus the battery 90 moves upward relative to the battery attachment part 12. The chain saw 1A, as shown in FIGS. 6, 7, has the same effect as that of the first battery removal mechanism 100 in the chain saw 1 (see FIG. 1).

The chain saw 1 of this embodiment, as shown in FIG. 1, includes the battery case 14, but may not include the battery case 14.

This embodiment has been described about the chain saw 1 to which the disclosure applies, however, the disclosure herein is not limited to a chain saw, and is applicable to various electric power work devices such as a brush cutter, a hedge trimmer, and a blower.

What is claimed is:
1. An electric power work device comprising:
   a body case;
   a work tool protruding forward from a front part of the body case;
   a motor configured to drive the work tool; a battery configured to supply electric power to the motor; and
   a battery removal mechanism,
     wherein the body case receives the motor,
     wherein the body case comprises:
       a body part;
       a top handle provided above the body part and extending in a longitudinal direction; and
       a battery attachment part to which the battery is vertically detachably attached, the battery attachment part being disposed behind the body part in the longitudinal direction,
     wherein the battery removal mechanism comprises:
       a lower end of the battery;
       a bottom surface of the body part of the body case, and
       a protrusion formed on the bottom surface of the body part of the body case,
     wherein the protrusion is disposed in front of the lower end of the battery in the longitudinal direction and at a rear part of the body part which is located at the rear of a center of the body part in the longitudinal direction,
     wherein the battery removal mechanism is configured to remove the battery upward from the battery attachment part by pushing down a rear end of the top handle,
     wherein while the battery is attached to the battery attachment part, the lower end of the battery protrudes downward from a rear portion of the bottom surface of the body part of the body case, and a frontmost end of the battery is disposed in front of the rear end of the top handle,
     wherein while the electric power work device is placed on a floor, a contact point between the floor and the battery is disposed in front of the rear end of the top handle in the longitudinal direction,
     wherein the lower end of the battery includes an inclined and chamfered surface facing the floor, which is configured to allow the contact point to shift as the rear end of the top handle is pushed down.
2. The electric power work device according to claim 1, wherein a rear end of the top handle is joined to an upper end of the battery attachment part, wherein the battery attachment part inclines such that a lower part of the battery attachment part is disposed in front of an upper part of the battery attachment part.

3. The electric power work device according to claim 1, wherein the body case has a side surface on which a side handle is attached,
wherein the side handle is disposed at the side of the top handle and extends from the front part toward the rear part of the body part of the body case.

4. The electric power work device according to claim 1, wherein the inclined surface extends downward as the inclined surface extends from a rear part to a front part of the battery.

5. The electric power work device according to claim 1, wherein an upper end of the battery is disposed above a lower peripheral end of a rear end of the top handle.

6. An electric power work device comprising:
a body case;
a work tool protruding forward from a front part of the body case;
a motor configured to drive the work tool;
a battery configured to supply electric power to the motor; and
a battery removal mechanism,
   wherein the body case receives the motor,
   wherein the body case comprises:
      a body part;
      a top handle provided above the body part and extending in a longitudinal direction; and
      a battery attachement part to which the battery is vertically detachably attached,
   wherein the battery removal mechanism commprises:
      a lower end of the battery;
      a bottom surface of the body part of the body case; and
      a protrusion formed on the bottom surface of the body part of the body case,
   wherein the body case is configured to rotate about the protrusion as a fulcrum in contact with a floor, between:
      a first position in which a front part of the bottom surface and the lower end of the battery also contact the floor, and
      a second position in which the lower end of the battery also contacts the floor but the front part of the bottom surface is separated from the floor,
   wherein the battery removal mechanism is configured to remove the battery upward from the battery attachment part by pushing down a rear end of the top handle,
   wherein while the battery is attached to the battery attachment part, the lower end of the battery protrudes downward from a rear portion of the bottom surface of the body part of the body case, and
   wherein the protrusion is disposed in front of the lower end of the battery in the longitudinal directin and at a rear part of the body part which is located at the rear of a center of the body part in the longitudinal direction.

7. The electric power work device according to claim 2, wherein a rear end of the top handle is joined to an upper end of the battery attachment part,
wherein the battery attachment part inclines such that a lower part of the battery attachment part is disposed in front of an upper part of the battery attachment part.

8. The electric power work device according to claim 2, wherein the body case has a side surface on which a side handle is attached,
wherein the side handle is disposed at the side of the top handle and extends from the front part toward the rear part of the body part of the body case.

9. The electric power work device according to claim 2, wherein the battery has a lower surface having an inclined surface which extends downward as the inclined surface extends from a rear part to a front part of the battery.

10. The electric power work device according to claim 2, wherein an upper end of the battery is disposed above a lower peripheral end of a rear end of the top handle.

* * * * *